Nov. 26, 1963    D. L. HORE    3,111,958
AUTOMATIC VALVE LUBRICATOR SYSTEM
Filed June 30, 1960    2 Sheets-Sheet 1

INVENTOR
Donald Lionel Hore
BY
Stevens Davis Miller & Mosher
ATTORNEYS

Nov. 26, 1963  D. L. HORE  3,111,958
AUTOMATIC VALVE LUBRICATOR SYSTEM
Filed June 30, 1960  2 Sheets-Sheet 2
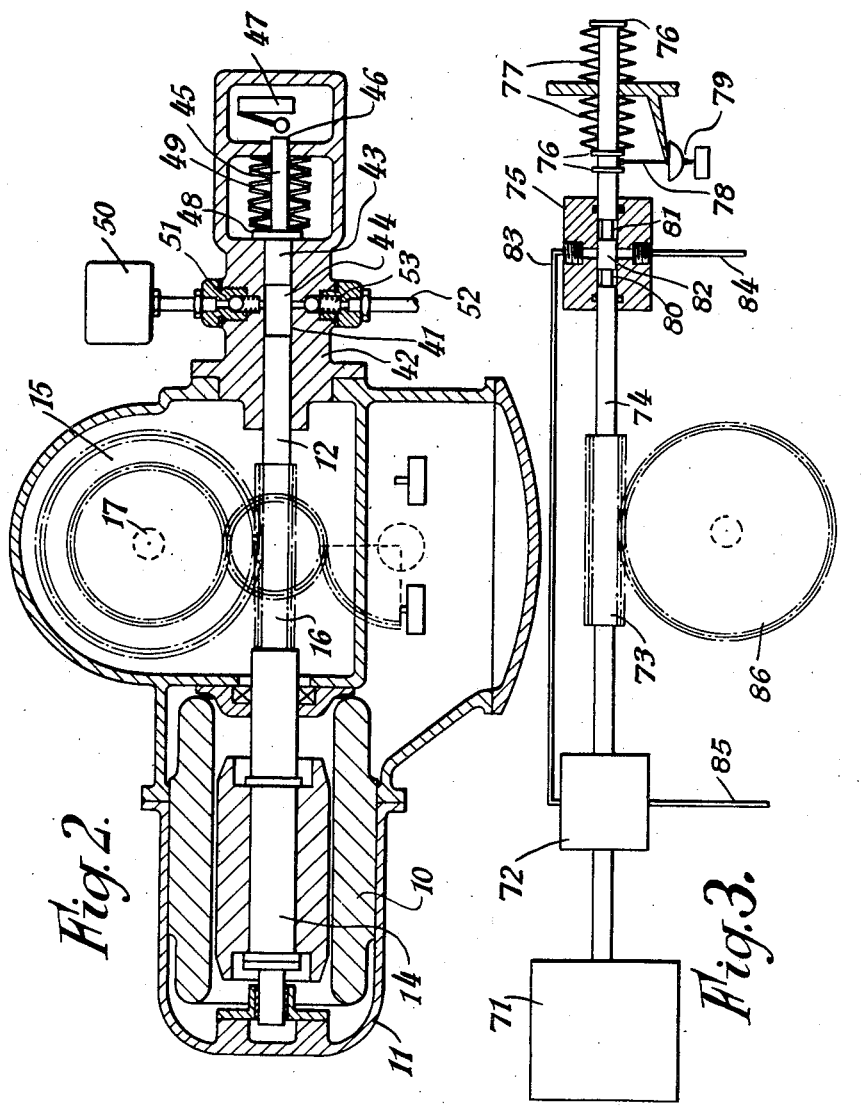
INVENTOR
Donald Lionel Hore
BY
Stevens Davis Miller & Mosher
ATTORNEYS

United States Patent Office 3,111,958
Patented Nov. 26, 1963

3,111,958
AUTOMATIC VALVE LUBRICATOR SYSTEM
Donald Lionel Hore, Bath, England, assignor to Rotork Engineering Company Limited, Bath, England
Filed June 30, 1960, Ser. No. 39,999
Claims priority, application Great Britain July 2, 1959
10 Claims. (Cl. 137—246.13)

This invention relates to lubricators for valves and particularly for valves which are adapted to be operated by remote control. It is frequently found that valves of this type are left completely unattended for long periods, as they tend to be inaccessible or in distant places, and as a consequence failure has been largely due to lack of regular lubrication. It is an object of the invention to provide means whereby a small supply of lubricant is automatically fed to a valve when necessary.

It will be apparent that lubrication is particularly necessary to initiate the operation of a stiff valve, and that the provision of means for automatically supplying lubricant at each operation of the valve might easily result in over-lubrication when the valve is frequently operated. It is therefore a further object of the invention to provide a supply of lubricant to a valve which is a function of its stiffness. It is also an object of the invention to supply the lubricant to the valve immediately prior to its operation.

According to this invention a valve lubricator comprises means for supplying lubricant between mutually engageable and relatively movable parts of the valve which means are actuated by a device or devices responsive to resistance to the relative movement of said parts.

It will be understood that lubricant may be supplied to any relatively movable parts of the valve or its actuating mechanism where resistance to movement is likely to occur. Usually such resistance will be most considerable between a valve closure member and its seat, but it will be appreciated that in some types of valve stiffness may occur as readily or more readily in the valve actuating mechanism.

The invention is particularly applicable to valves having actuating mechanism operated by power means, such as a reversible electric motor, with or without means for alternative manual operation. Such valves are usually provided with position limit switches, whereby the power means is de-energized at the end of a closing or opening movement of the valve. Such valves may be additionally or alternatively provided with a torque limit switch or switches, whereby the power means is de-energized on the development of a predetermined torque due, for example, to the closing of the valve on to its seat, to an obstruction in the valve, or to a stuck valve. Conveniently the torque-responsive device comprises a shaft or spindle in the valve actuating mechanism which is spring loaded for movement in one or both axial directions from its normal position, such movement being dependent on the torque applied in one direction or the other. Axial movement of the shaft is utilized to operate a switch by means of suitable linkage.

A torque-responsive device of this type is advantageously employed according to the present invention to actuate a pump supplying lubricant to the valve. Preferably the pump comprises a small high pressure plunger pump by which sufficient lubricant is supplied to the valve at a single stroke of the plunger. The device is so arranged that the pump is actuated at a lower predetermined torque than that required to operate the torque limit switch. The lubricant supplied in the single stroke of the pump should be usually sufficient to free a stuck valve before the torque has reached the predetermined value required to operate the torque limit switch. Should the lubricant fail on occasion to free the valve, the operation of the torque limit switch will prevent damage to the valve and its mechanism. Renewed operation of the power means after a short interval will, if necessary, provide a further supply of lubricant to free a particularly stubborn seizure. Lubrication takes place always before the operating movement of the valve member is commenced.

The lubricator according to the invention is primarily intended for use with plug cocks or valves of the rotary cylindrical or rotary conical type. In valves of this type lubricators have been provided in which fluid has been supplied to act as a lubricant and also as a seal between the moving parts. In some valve designs the fluid has also operated a jacking medium to lift a stuck valve. The invention is applicable to supply fluid so as to provide these three features, the lubricant being supplied as a function of the torque whenever the stiffness exceeds a predetermined amount. The lubricant is thereby supplied at any position of the valve.

The lubricator according to the invention is also adapted for use with any other type of valve that requires lubrication, such as parallel-sided, double-wedging, through-conduit valves, or various types of gate valve, or screw-down valves. The lubricator is adapted to be actuated by the torque-responsive device in either the closed or the open position of the valve.

The invention will now be described by way of example with reference to the accompanying drawings, in which:

FIGURE 2 is a part sectional elevation of a modified arrangement of the actuator of FIGURE 1; and FIGURE 3 is a diagrammatic arrangement of a power-operated valve actuator in which the worm shaft directly operates the lubricator.

Figure 1:
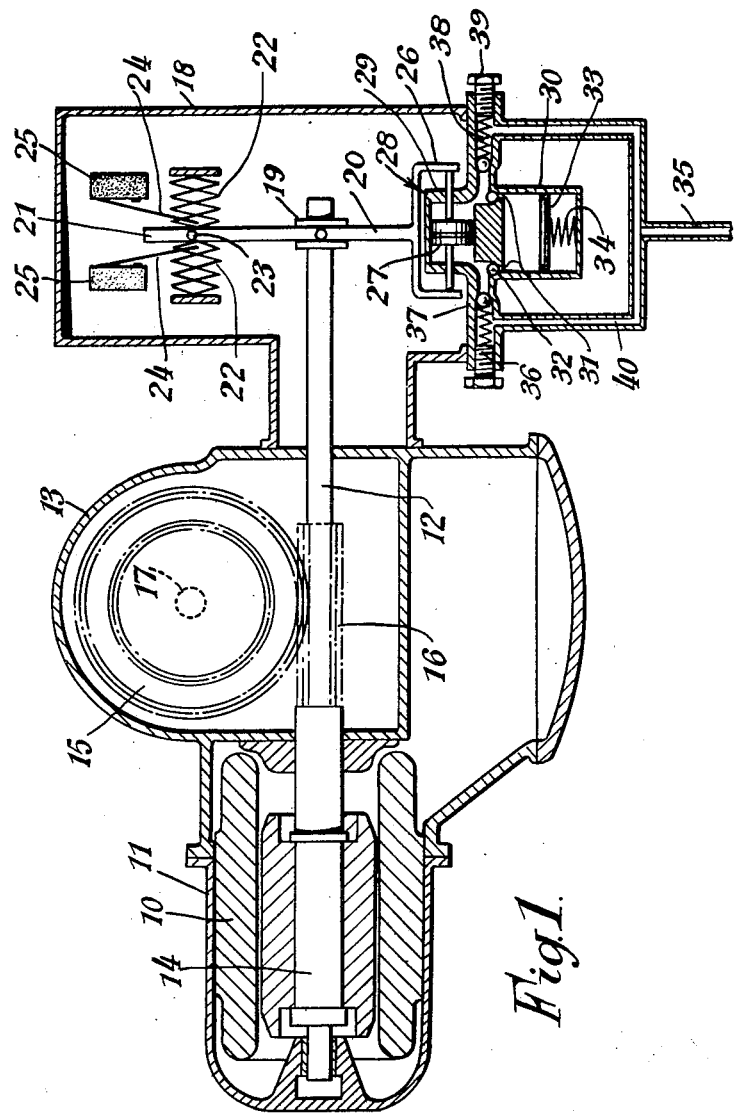
FIGURE 1 is a sectional elevation of a power-operated valve actuator incorporating the invention.

Referring now to FIGURE 1 of the drawings the lubricator shown is intended for a rotary cylindrical valve. The valve actuating mechanism comprises a reversible electric motor 10 located in a housing 11. A worm shaft 12 in the casing 13 is formed integral or coupled to the driving shaft 14 of the motor 10. A worm wheel 15 in casing 13 is drivably engaged by the worm 16 on shaft 12 and is mounted by means of a driving sleeve (not shown) on the valve spindle 17. Back lash may be provided in the usual way in the connection between the driving sleeve and the valve spindle 17 so as to provide a hammer blow at the commencement of valve actuation. A hand wheel (not shown) may also be mounted coaxially with the valve spindle 17, a clutch being provided on the driving sleeve whereby the latter is connected alternately with the hand wheel and the worm wheel 15.

The actuator casing 13 is provided with an extension 18 and the worm shaft 12 extends from the casing 13 into the extension 18. The end of the worm shaft is provided with collars 19 to which is non-rotatably and pivotally secured an operating lever 20. One end 21 of the lever 20 is located between two spring packs 22 and which may comprise Belleville washers. The end 21 is also provided with an operating stud 23 for engaging one or other of the spring arms 24 of torque limit switches 25. When the motor 10 rotates it will apply an end load to the worm shaft 12. If valve operation is easy the worm wheel 15 will rotate the valve spindle 17 until the position limit switches operate to isolate the motor. If, however, the valve is difficult to operate the end load on the shaft 12 will cause axial movement of the shaft in one direction or the other as permitted by the spring packs 22. Eventually the axial movement of the shaft 12 actuates one of the arms 24 to close the appropriate torque limit switch 25 to isolate the motor.

This axial movement of the worm shaft 12 is also utilized to apply lubrication to the valve parts. The other end of the lever 20 is formed with a bifurcated portion 26 the arms of which are connected to the piston 27 of a double acting plunger pump 28. Each end of the cylinder 29 of the pump 28 is connected with a reservoir 30 through ports 31 normally closed by non-return valves 32. The lubricant in the reservoir 30 is maintained under a predetermined pressure by means of a movable member 33 which is resiliently urged by the spring 34. Each end of the cylinder 29 is also connected with an outlet conduit 35 through adjustable pressure sensing valves shown generally at 36. Each valve 36 comprises a ball seated in the outlet port 37 and resiliently urged by a spring 38 the tension of which is adjustable by a screw 39. Each port 37 communicates with an outlet passageway 40 and each passageway 40 is in free communication with the outlet conduit 35. The outlet conduit 35 is connected in the usual way with passages between the valve member and its housing.

It will be appreciated that axial movement of the shaft 12 in either direction effects a single stroke of the pump 28. The pressure sensing valves are so adjusted that the stroke of the pump ejects lubricant through the outlet conduit 35 prior to operation of the apropriate torque limit switch 25.

When the stuck valve is freed by the lubricant axial movement of the shaft 12 ceases and any further lubricant will be supplied by the pump 28. It will be appreciated that the position of the lever 20 will fluctuate in accordance with the load applied to the shaft 12 and that the pump 28 will be recharged with lubricant during reverse movements of the shaft 12.

It will be appreciated that the quantity of lubricant supplied to the valve is a function of the stiffness of the valve and if the charge of lubricant delivered does not free the valve the torque switch will be operated to isolate the motor at which time the actuator can be operated again in the opposite direction to apply another shot of lubricant.

It will be appreciated that the full effort of the load on the worm shaft is applied so as to build up the maximum lubricant pressure independently of the thrust which is applied to operate the torque switch. In effect a differential load is applied to the pump piston and the torque switch.

Referring now to FIGURE 2 there is shown a modified arrangement which is applicable to the power operated actuator of the kind shown in FIGURE 1. In FIGURE 2 the end of the worm shaft 12 is located in the bore 41 of a housing 42. A plunger 43 is also mounted in the bore 41 so as to leave a cavity 44 therebetween. The plunger 43 has an extension 45 the end of which is adapted to operate the arm 46 of a torque limit switch 47. The extension 45 is also provided with a collar 48 which acts against a spring pack 49 which may be made up of a plurality of Belleville washers. The lubricant reservoir 50 communicates with the cavity 44 through a non-return valve 51. The cavity 44 also communicates with an outlet conduit 52 through an adjustable pressure sensing valve 53. The outlet conduit 52 communicates with the valve for supplying lubricant thereto.

In the operation of this embodiment axial movement of the shaft due to stiffness of the valve compresses the lubricant in the cavity 44 until the lubricant is discharged to the main valve through the pressure sensing valve 53. If the supply of lubricant is not sufficient to free the valve then the thrust on the worm shaft 12 is transmitted to the plunger 43 to compress the spring pack 49 and ultimately trip the torque switch 47. The return of the worm shaft will of course draw a fresh supply of lubricant from the reservoir 50 through the non-return valve 51.

It will be appreciated in this arrangement that the full effort of the load on the worm shaft is applied to the lubricant so as to build up the maximum lubricant pressure independently of the thrust which is applied to operate the torque switch.

Referring now to FIGURE 3 of the drawings there is shown diagrammatically an alternative method whereby the motor 71 drives a pump 72 which is situated between the motor and the worm 73. The worm shaft 74 extends through a valve block 75 and is provided at its end with collars 76 which act against spring packs 77 so as to normally restrain axial movement. The movement of the collars 76 are adapted also to operate an arm 78 to actuate a torque switch 79.

The shaft 74 is provided with two portions 80 and 81 of reduced diameter so as to leave a portion 82 therebetween which is the full diameter of the bore in the valve block 75. The portion 82 normally blocks communication through the valve block between the outlet conduit 83 of the pump 72 and the conduit 84 to the main valve to be lubricated. Axial movement of the worm shaft 74 in one direction or the other moves a portion 80 or 81 into a position to permit lubricant to be fed by the pump directly to the main valve. If this fails to free the valve, further axial movement of the shaft 74 operates the torque limit switch 79. In this embodiment the pump is connected to the reservoir by the conduit 85 and the worm wheel is shown by the reference 86.

It will, of course, be appreciated that the mechanical transmission from the worm shaft in the above embodiments may be replaced by an electrical or fluid pressure relay. For example, in FIGURE 1 the lever 20 may be adapted to operate either one of a pair of switches to energize a solenoid acting directly on the pump plunger.

I claim:
1. A valve lubricator comprising a reversible valve actuating power device having an axially shiftable drive shaft, a worm carried by said drive shaft and engaged with a valve actuating worm wheel with said worm and said drive shaft being axially movable in response to excessive torque requirements in the rotation of said worm wheel, a source of lubricant, means responsive to the axial movement of said drive shaft for controlling the delivering of lubricant from said source to the valve, and at least one torque limit switch responsive to axial movement of said drive shaft subsequent to the delivery of lubricant to control said power device.

2. A valve actuator as claimed in claim 1, wherein the worm shaft reciprocates in the bore of a housing to provide a closed chamber to which lubricant is supplied, whereby axial movement of the worm shaft ejects lubricant under pressure from the said chamber to the relatively movable valve parts.

3. A valve actuator as claimed in claim 2, wherein the chamber is formed additionally by a movable plunger located in the said bore, said plunger being operable by the worm shaft after the discharge of lubricant to actuate a torque responsive switch.

4. A valve actuator as claimed in claim 1, wherein the power device is drivably connected to a pump for supplying lubricant to the relatively movable valve parts, the supply of lubricant being controlled by a valve member operable by the axial movement of said worm shaft.

5. A valve actuator as claimed in claim 4, wherein the worm shaft is formed with a valve element movable in a housing to control the flow of lubricant from the pump to the relatively movable valve parts.

6. The valve lubricator of claim 1 wherein there are two of said torque limit switches, one for each direction of axial movement of said drive shaft.

7. The valve lubricator of claim 1 wherein there are two of said torque limit switches, one for each direction of axial movement of said drive shaft, and said torque limit switches and said lubricant control means are actuated by opposite ends of a lever carried by said drive shaft.

8. The valve lubricator of claim 7 wherein said lever is pivoted to said drive shaft and movement of the switch actuating end of said lever is resisted by opposed spring means.

9. A valve lubricator comprising a reversible valve actuating power device having an axially shiftable drive shaft, a worm carried by said drive shaft and engaged with a valve actuating worm wheel with said worm and said drive shaft being axially movable in response to excessive torque requirements in the rotation of said worm wheel, a source of lubricant, means responsive to the axial movement of said drive shaft for controlling the delivering of lubricant from said source to the valve, and said lubricant control means including a cylinder having opposite ends thereof in communication with said lubricant supply through one-way inlet valves, a central piston in said cylinder for pumping lubricant in opposite directions, said piston being driven by axial movement of said drive shaft, means to pressurize the lubricant in said source, and one-way discharge valves at opposite ends of said cylinder controlling flow of lubricant from said cylinder, there being two torque limit switches, one for each direction of axial movement of said drive shaft, and said torque limit switches and said lubricant control means being actuated by opposite ends of a lever carried by said drive shaft.

10. The valve lubricator of claim 9 wherein said lever is pivoted to said drive shaft and movement of the switch actuating end of said lever is resisted by opposed spring means.

References Cited in the file of this patent
UNITED STATES PATENTS

| | | |
|---|---|---|
| 2,055,449 | Beckwith | Sept. 22, 1936 |
| 2,086,725 | McCausland et al. | July 13, 1937 |
| 2,203,233 | Panish | June 4, 1940 |
| 3,010,435 | Abrams | Nov. 28, 1961 |